UNITED STATES PATENT OFFICE.

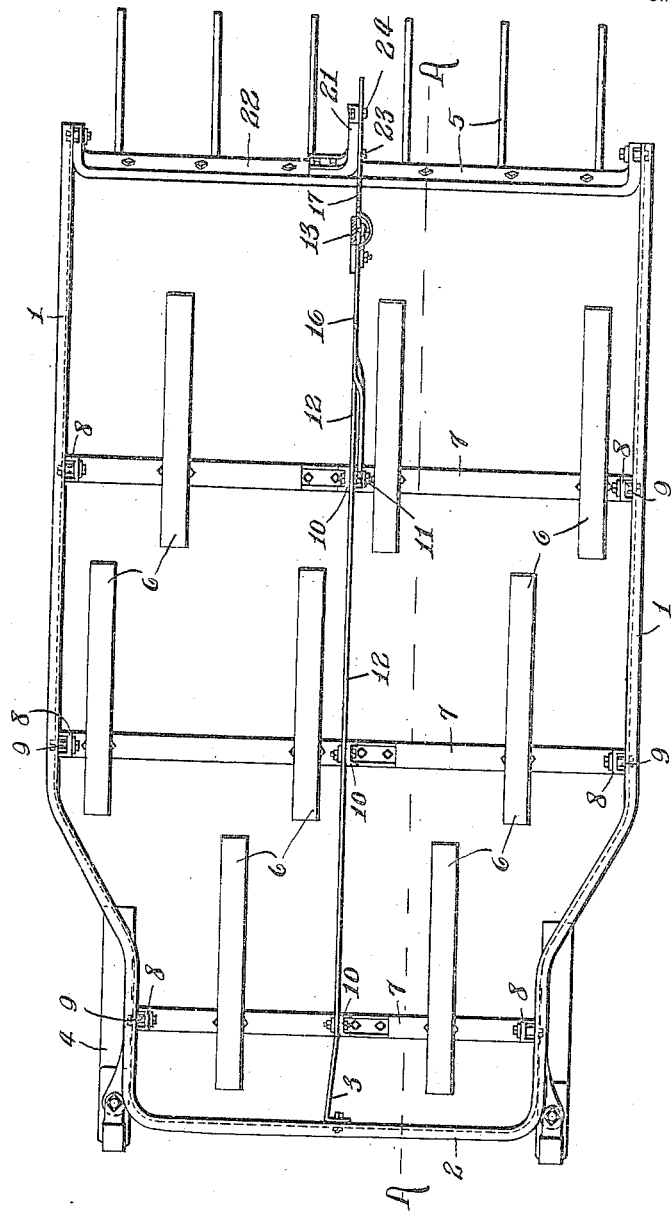

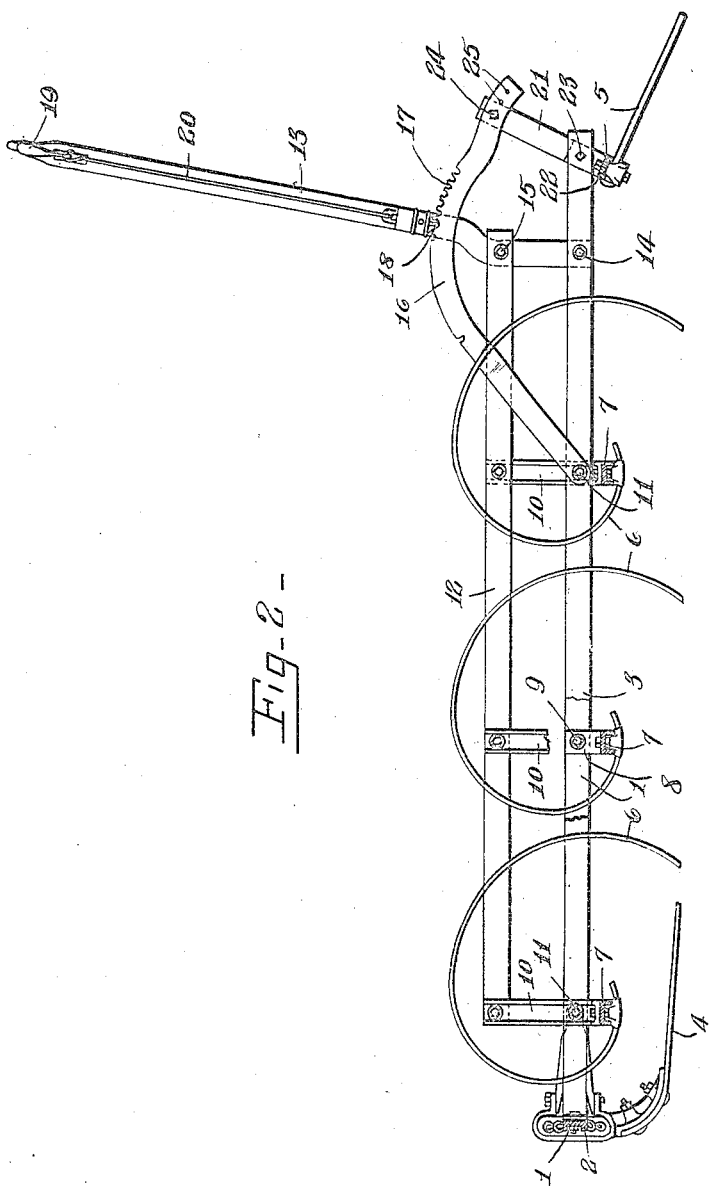

WILLIAM H. LEE, OF SYRACUSE, NEW YORK, ASSIGNOR TO SYRACUSE CHILLED PLOW COMPANY, OF SYRACUSE, NEW YORK, A CORPORATION OF NEW YORK.

HARROW.

1,253,609.  Specification of Letters Patent.  Patented Jan. 15, 1918.

Application filed April 15, 1915. Serial No. 21,508.

*To all whom it may concern:*

Be it known that I, WILLIAM H. LEE, a citizen of the United States, residing at Syracuse, in the county of Onondaga and State of New York, have invented a certain new and useful Harrow, of which the following is a specification.

This invention relates to spring tooth harrows and has for its object a particularly simple and efficient mechanism by which the teeth of the harrow are raised and lowered; and the invention consists in the combinations and constructions hereinafter set forth and claimed.

In describing this invention, reference is had to the accompanying drawings, in which like characters designate corresponding parts in all the views.

Figure 1 is a plan view of a harrow or a section of a harrow constructed in accordance with my invention.

Fig. 2 is a sectional view taken on the plane of line A—A, Fig. 1.

1 designates the frame of the harrow which may be of any desirable form, size and construction, and as here shown, consists of side bars and a front bar 2 connecting the front ends of the side bars and usually formed integral therewith.

3 is a frame element extending lengthwise of the frame 1 midway between the side bars thereof and being connected at its front end to the cross-bar 2 and at its rear end to the support for the rear end of the frame. As here shown, the frame is supported at its front end by runners 4 and at its rear end by a rake 5, to be hereinafter described in detail.

6 are spring harrow teeth, here shown as arranged in three series extending transversely of the frame in the ordinary manner, each series being supported by a rocking support, as a rocking bar 7 in the form of a bail having short upturned arms 8 at its ends, which are pivoted at 9 to the side bars of the frame 1, each bar 7 extending under the frame element 3 and being provided with an upwardly extending rock arm 10 pivoted at 11 between its ends to the frame bar 3.

12 is a rod connecting the upper ends of all the rock arms 10 and by means of which the motion of the operating lever is transmitted to the rocking bars 7. 13 is the operating lever pivoted at 14 at its lower end to the frame element 3 and being pivoted at 15 to the rear end of the rod 12.

16 is a segment which is supported by the frame bar 3 and is provided with a rack 17 for coacting with the pawl 18 on the lever 13. The pawl is operated by a suitable grip lever 19 and is connected thereto by a link 20.

In spring tooth harrows which are supported at their front and rear ends as by shoes and a rake, as will be understood by those skilled in the art, the segment 16 is so mounted that it has a fore and aft movement during the movement of the operating lever, and hence the operating lever must have a long throw in order to raise and lower the harrow teeth, that is, it must have a throw equal to the amount of movement necessary to rock the bars 7 plus the amount of movement of the segment.

In my harrow, as constructed, provision is made whereby the rack and the point at which the lever is pivoted to the frame are stationary and have no fore and aft movement. In my harrow construction, the segment 16 is secured at its front end to the frame element 3 and at its rear end to means normally fixed relatively to the frame element 3, and as here shown, said segment is fixed at its front end to the pivot 11 connecting the rear rock arm 10 and the frame element 3, and at its rear end to an upwardly extending rock arm 21 rising from a rocking bar 22 carrying the teeth of the rake 5. This bar 22 is similar in construction to the bars 7.

The arm 21 extends upwardly from the bar 22 between the ends thereof and is pivoted at 23 to the rear end of the frame element 3. Said rock arm 21 is secured at its upper end by a pin 24 to the rear end of the segment 16, and the segment 16 is provided with a series of holes 25 in any one of which the pin 24 may be inserted. Owing to the series of holes 25, the angle of the arm 21 and rocking bar 22 relatively to a horizontal plane can be varied and hence the incline of the rake teeth varied.

What I claim is:—

1. A harrow comprising a frame including a stationary element extending lengthwise thereof, a rocking bar pivoted to the frame, harrow teeth carried by the rocking bar, the rocking bar having an upwardly extending rock arm pivoted to the frame element, a lever pivoted to the frame element and connected to said rock arm, the lever having a pawl associated therewith, a rack supported from the frame element in position to coact with the pawl, the rack being connected to the frame element by the same pivot connecting the upwardly extending rock arm and the frame element, substantially as and for the purpose set forth.

2. A harrow comprising a frame, a rockable bar supported by the frame, rake teeth projecting downwardly and rearwardly from the bar, the rockable bar having an arm rigid therewith, a rocking bar pivoted to the frame, harrow teeth carried by the last-named bar, a segment formed with a rack, the segment being secured at one end to the frame and at its other end to said arm on the rake bar, a lever pivoted to the frame, means connecting the lever and the rocking bar supporting the harrow teeth for transmitting the motion of the lever to said rocking bar, and a pawl associated with the lever and coacting with the rack substantially as and for the purpose described.

3. A harrow comprising a frame including a lengthwise element, rocking bars pivoted at their ends to the frame and extending under the frame element, arms extending upwardly from the rocking bars and being pivoted between their ends to the frame element, a rod connecting said arms and being pivoted thereto, a lever pivoted to the lengthwise frame element and to said rod, the lever having a pawl associated therewith, an additional rocking bar at the rear end of the frame having rearwardly and downwardly extending rake teeth, and also having an upwardly extending arm pivoted to the frame element and extending above the same, and a segment secured at its front end to the frame element and at its rear end to the upwardly extending arm of the rake bar, the segment having a rack coacting with the pawl of the lever, substantially as and for the purpose set forth.

4. A harrow comprising a frame including a lengthwise element, rocking bars pivoted at their ends to the frame and extending under the frame element, arms extending upwardly from the rocking bars and being pivoted between their ends to the frame element, a rod connecting said arms and being pivoted thereto, a lever pivoted to the lengthwise frame element and to said rod, the lever having a pawl associated therewith, an additional rocking bar at the rear end of the frame having rearwardly and downwardly extending rake teeth, and also having an upwardly extending arm pivoted to the frame element and extending above the same, and a segment secured at its front end to the frame element and at its rear to the upwardly extending arm of the rake bar, the segment having a rack coacting with the pawl of the lever, the upwardly extending arm of the rake bar being adjustably secured to the segment, substantially as and for the purpose described.

In testimony whereof, I have hereunto signed my name in the presence of two attesting witnesses, at Syracuse, in the county of Onondaga, and State of New York, this first day of April, 1915.

WILLIAM H. LEE.

Witnesses:
M. E. FORBES,
V. A. BECKER.

Copies of this patent may be obtained for five cents each, by addressing the "Commissioner of Patents, Washington, D. C."